US012709194B2

(12) United States Patent
Yan et al.

(10) Patent No.: US 12,709,194 B2
(45) Date of Patent: Aug. 18, 2026

(54) BATTERY SELF-HEATING CONTROL SYSTEM AND CONTROL METHOD, AND ELECTRIC TRANSPORTATION MEANS

(71) Applicant: BYD COMPANY LIMITED, Shenzhen (CN)

(72) Inventors: Lei Yan, Shenzhen (CN); Wen Gao, Shenzhen (CN); Junwei Zhang, Shenzhen (CN); Gan Song, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 19/055,269

(22) Filed: Feb. 17, 2025

(65) Prior Publication Data

US 2025/0214487 A1 Jul. 3, 2025

Related U.S. Application Data

(63) Continuation of application No. PCT/CN2023/090524, filed on Apr. 25, 2023.

(30) Foreign Application Priority Data

Aug. 31, 2022 (CN) ........................ 202211068408.3

(51) Int. Cl.

*B60L 58/27* (2019.01)
*H01M 10/46* (2006.01)

(Continued)

(52) U.S. Cl.

CPC ............ *B60L 58/27* (2019.02); *H01M 10/46* (2013.01); *H01M 10/615* (2015.04);

(Continued)

(58) Field of Classification Search

CPC ............... B60L 58/27; B60L 2240/545; B60L 2240/549; B60L 15/007; B60L 58/18;

(Continued)

(56) References Cited

U.S. PATENT DOCUMENTS 5,990,661 A * 11/1999 Ashtiani ............ H01M 10/625 320/128
6,882,061 B1 * 4/2005 Ashtiani ................ H02J 7/855 219/209

(Continued)

FOREIGN PATENT DOCUMENTS

CN 105162199 A 12/2015
CN 105762434 A 7/2016

(Continued)

OTHER PUBLICATIONS

The World Intellectual Property Organization (WIPO) International Search Report for PCT/CN2023/090524 Jul. 5, 2023 6 Pages (including translation).

*Primary Examiner* — Regis J Betsch
*Assistant Examiner* — Alex W Lam
(74) *Attorney, Agent, or Firm* — Wenye Tan

(57) ABSTRACT

A battery self-heating control system includes a battery pack, a winding, a first switch assembly, a second switch assembly, a capacitor, and a controller. The battery pack includes a first battery group and a second battery group connected in series, a connection line led out between the first and the second battery groups, and connected to one end of the winding. The first switch assembly and the second switch assembly are connected in series, the first switch assembly is electrically connected to a positive electrode of the first battery group and a first end of the capacitor, the second switch assembly is electrically connected to a negative electrode of the second battery group and a second end of the capacitor, the first end and the second end of the (Continued)

capacitor connected to a load. The controller is electrically connected to the first switch assembly and the second switch assembly.

9 Claims, 10 Drawing Sheets

(51) Int. Cl.
*H01M 10/615* (2014.01)
*H01M 10/625* (2014.01)
*H01M 10/637* (2014.01)

(52) U.S. Cl.
CPC ....... *H01M 10/625* (2015.04); *H01M 10/637* (2015.04); *H01M 2220/20* (2013.01)

(58) Field of Classification Search
CPC .... B60L 58/25; B60L 2240/54; H01M 10/46; H01M 10/615; H01M 10/625; H01M 10/637; H01M 2220/20; Y02E 60/10; H02J 7/0016; H02J 7/00; B60Y 2200/91; Y02T 10/70
See application file for complete search history.

(56) References Cited

U.S. PATENT DOCUMENTS

| | | | | |
|---|---|---|---|---|
| 2013/0200849 | A1 | 8/2013 | Crebier et al. | |
| 2022/0102769 | A1* | 3/2022 | Shidore | H01M 10/443 |
| 2023/0062270 | A1* | 3/2023 | Li | H01M 10/48 |

FOREIGN PATENT DOCUMENTS

| | | | |
|---|---|---|---|
| CN | 111660875 | A | 9/2020 |
| CN | 113348616 | A | 9/2021 |
| CN | 113752875 | A | 12/2021 |
| CN | 217074099 | U | 7/2022 |
| CN | 114889494 | A | 8/2022 |
| CN | 113752875 | B | 7/2023 |
| CN | 117673570 | A | 3/2024 |
| DE | 102010001422 | A1 | 8/2011 |
| JP | 2009142069 | A | 6/2009 |

* cited by examiner 11
20
30
101
102
Electric motor controller
Other high-voltage loads
12
40
50

BATTERY SELF-HEATING CONTROL SYSTEM AND CONTROL METHOD, AND ELECTRIC TRANSPORTATION MEANS

CROSS-REFERENCE TO RELATED APPLICATIONS

The present application is a continuation application of PCT application No. PCT/CN2023/090524, filed on Apr. 25, 2023, which claims priority to Chinese Patent Application No. 202211068408.3 published on Aug. 31, 2022, content of all of which is incorporated herein by reference in its entirety.

FIELD

The present disclosure relates to the technical field of battery self-heating control systems, and specifically, to a battery self-heating control system and control method, and an electric transportation means.

BACKGROUND

With the development of science and technology, electric transportation means gradually become main transportation means for people to travel daily. For example, electric vehicles have gradually become the mainstream. Generally, a battery pack is arranged in an electric transportation means, and the battery pack supplies power to a load in the electric transportation means. However, the battery pack is affected by temperature. At a low temperature, the electrical performance of the battery pack is degraded, which seriously affects the discharging performance of the battery pack, resulting in problems such as shortened driving mileage and limited output power during driving.

In the related art, the battery pack is heated in an external heating manner, i.e., a battery heater is arranged to heat the battery pack. When it is detected that the temperature of the battery pack is excessively low, a switch inside the battery heater is turned on, so that a resistor of the battery heater is energized to generate heat, and the generated heat flows to the battery pack through an air channel or a water channel to heat the battery pack.

Because a pipe of the air channel or the water channel is long, heat loss is large, and as a result the battery pack has a slow heating speed and a long heating time, affecting a heating effect.

SUMMARY

Embodiments of the present disclosure provide a battery self-heating control system, to resolve one or more problems in the related art that a battery pack has a slow heating speed and a long heating time due to a large heat loss caused by a long pipe of an air channel or a water channel, and in addition, a heating effect is affected due to a nonuniform temperature field distribution of the battery pack when the battery pack is heated through the air channel or the water channel.

Embodiments of the present disclosure provide a battery self-heating control system. The control system includes a battery pack, a winding, a first switch assembly, a second switch assembly, a capacitor, and a controller.

The battery pack includes a first battery group and a second battery group that are connected in series. A connection line is led out between the first battery group and the second battery group. The connection line is connected to one end of the winding. The first switch assembly and the second switch assembly are connected in series. The first switch assembly is electrically connected to a positive electrode of the first battery group and a first end of the capacitor. The second switch assembly is electrically connected to a negative electrode of the second battery group and a second end of the capacitor. The first end and the second end of the capacitor are used for connecting to a load. The other end of the winding is connected between the first switch assembly and the second switch assembly. The controller is electrically connected to the first switch assembly and the second switch assembly. The controller is configured to control the first switch assembly and the second switch assembly to switch between an on state and an open state, and make the first battery group and the second battery group perform alternate charging and discharging through the winding, to heat the battery pack. At least one of the first battery group, the second battery group, and the capacitor is configured to supply power to the load.

According to a second aspect, embodiments of the present disclosure provide a control method, including: controlling a first switch assembly and a second switch assembly to switch between an on state and an open state; and making a first battery group and a second battery group perform alternate charging and discharging through a winding, to heat a battery pack, at least one of the first battery group, the second battery group, and capacitor charging being configured to supply power to a load.

According to a third aspect, embodiments of the present disclosure provide an electric transportation means, including the foregoing battery self-heating control system according to any of the first aspect.

In the embodiments of the present disclosure, the connection line led out between the first battery group and the second battery group is connected to one end of the winding. The first switch assembly and the second switch assembly are connected in series. The first switch assembly is electrically connected to the positive electrode of the first battery group and the first end of the capacitor. The second switch assembly is electrically connected to the negative electrode of the second battery group and the second end of the capacitor. The first end and the second end of the capacitor are used for connecting to the load. Therefore, the first switch assembly and the second switch assembly may be switched between the on state and the open state, so that the first battery group and the second battery group can charge or discharge each other. After the first battery group charges the second battery group, the first battery group may be charged through the second battery group, so that a current direction of the first battery group changes periodically, and a current direction of the second battery group changes periodically, which is equivalent to that an alternating current exists between the first battery group and the second battery group. The controller is electrically connected to the first switch assembly and the second switch assembly. Therefore, the controller may control the first switch assembly and the second switch assembly to switch between the on state and the open state, which is equivalent to that an alternating current exists between the first battery group and the second battery group, and the first battery group and the second battery group perform alternate charging and discharging to heat the battery pack, i.e., perform self-heating of the battery pack. In addition, when the first battery group and the second battery group perform alternate charging and discharging, both the first battery group and the second battery group are electrically connected to the winding, the first battery group and the second battery group perform mutual charging and discharging through the winding, and the first battery group and the second battery group charge the capacitor, so that the first battery group and the second battery group can supply power to the load, and the capacitor can also supply power to the load.

In other words, in the embodiments of the present disclosure, the controller controls the first switch assembly and the second switch assembly to switch between the on state and the open state, so that it is equivalent to that an alternating current exists between the first battery group and the second battery group. An effect of interlacing oscillations can be generated between the first battery group and the second battery group through the alternating current, so that the battery pack can generate heat, to avoid heating the battery pack in an external heating manner. In addition, heating is performed inside the battery pack, so that a temperature field distribution of the battery pack can be uniform, thereby improving heating efficiency.

Figure 1:
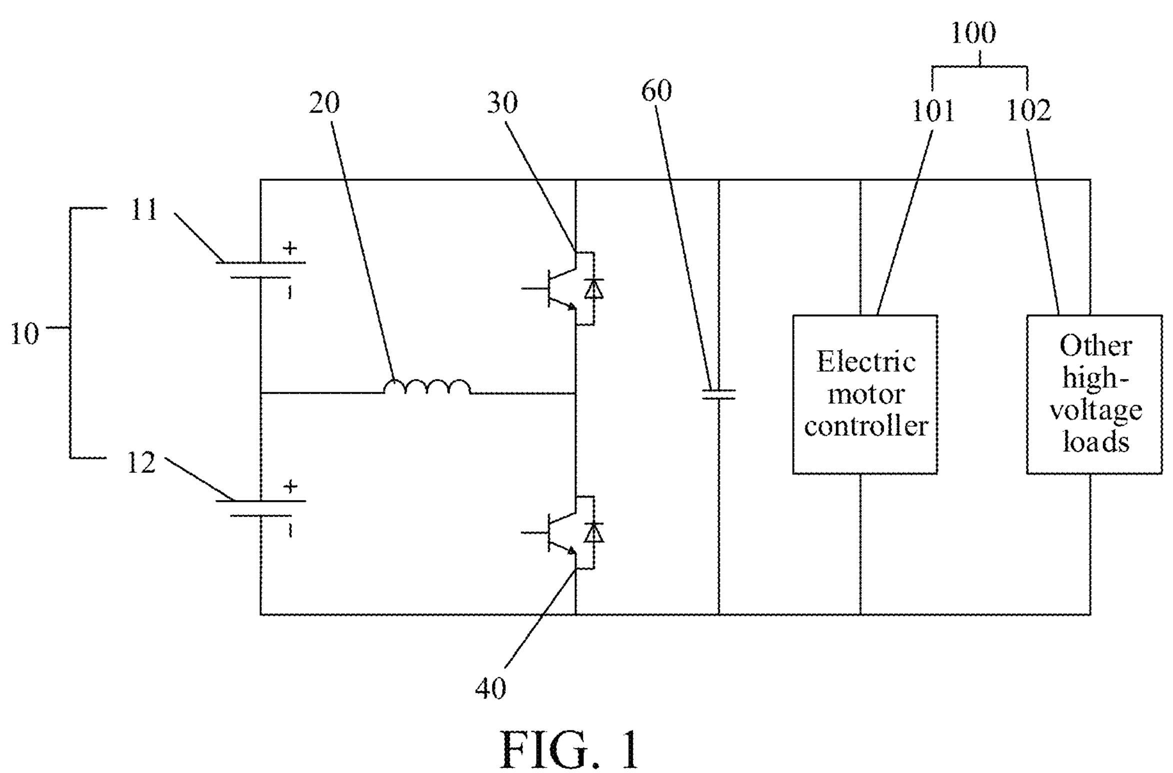
FIG. 1 is a schematic diagram 1 of a battery self-heating control system according to an embodiment of the present disclosure.

In the drawings: 10: battery pack; 20: winding; 30: first switch assembly; 40: second switch assembly; 50: capacitor; 60: switch device; 11: first battery group; 12: second battery group; 100: load; 101: electric motor controller; and 102: other high-voltage loads.

DETAILED DESCRIPTION

The following describes the technical solutions in the embodiments of the present disclosure with reference to the accompanying drawings. Apparently, the described embodiments are some of the embodiments of the present disclosure rather than all of the embodiments. Other embodiments obtained by a person of ordinary skill in the art based on the embodiments of the present disclosure without creative efforts shall fall within the protection scope of the present disclosure.

It should be understood that "one embodiment" or "an embodiment" mentioned throughout the specification means that a particular feature, structure, or characteristic related to the embodiment is included in at least one embodiment of the present disclosure. Therefore, "in one embodiment" or "in an embodiment" appearing everywhere throughout the specification may not necessarily refer to the same embodiment. In addition, the specific features, structures, or characteristics may be combined in one or more embodiments in any suitable manner.

As shown in FIG. 1, a battery self-heating control system includes a battery pack 10, a winding 20, a first switch assembly 30, a second switch assembly 40, a capacitor 50, and a controller (not shown in the figure).

The battery pack 10 includes a first battery group 11 and a second battery group 12 that are connected in series. A connection line is led out between the first battery group 11 and the second battery group 12. The connection line is connected to one end of the winding 20. The first switch assembly 30 and the second switch assembly 40 are connected in series. The first switch assembly 30 is electrically connected to a positive electrode of the first battery group 11 and a first end of the capacitor 50. The second switch assembly 40 is electrically connected to a negative electrode of the second battery group 12 and a second end of the capacitor 50. The first end and the second end of the capacitor 50 are used for connecting to a load 100. The other end of the winding 20 is connected between the first switch assembly 30 and the second switch assembly 40. The controller is electrically connected to the first switch assembly 30 and the second switch assembly 40. The controller is configured to control the first switch assembly 30 and the second switch assembly 40 to switch between an on state and an open state, and make the first battery group 11 and the second battery group 12 perform alternate charging and discharging through the winding 20, to heat the battery pack

10. At least one of the first battery group 11, the second battery group 12, and the capacitor 50 is configured to supply power to the load.

In the embodiments of the present disclosure, the connection line led out between the first battery group 11 and the second battery group 12 is connected to one end of the winding 20. The first switch assembly 30 and the second switch assembly 40 are connected in series. The first switch assembly 30 is electrically connected to the positive electrode of the first battery group 11 and the first end of the capacitor 50. The second switch assembly 40 is electrically connected to the negative electrode of the second battery group 12 and the second end of the capacitor 50. The first end and the second end of the capacitor 50 are used for connecting to the load 100. Therefore, the first switch assembly 30 and the second switch assembly 40 may be switched between the on state and the open state, so that the first battery group 11 and the second battery group 12 can charge or discharge each other. After the first battery group 11 charges the second battery group 12, the first battery group 11 may be charged through the second battery group 12, so that a current direction of the first battery group 11 changes periodically, and a current direction of the second battery group 12 changes periodically, which is equivalent to that an alternating current exists between the first battery group 11 and the second battery group 12. The controller is electrically connected to the first switch assembly 30 and the second switch assembly 40. Therefore, the controller may control the first switch assembly 30 and the second switch assembly 40 to switch between the on state and the open state, which is equivalent to that an alternating current exists between the first battery group 11 and the second battery group 12, and the first battery group 11 and the second battery group 12 perform alternate charging and discharging to heat the battery pack 10, i.e., perform self-heating of the battery pack 10. In addition, when the first battery group 11 and the second battery group 12 perform alternate charging and discharging, both the first battery group 11 and the second battery group 12 are electrically connected to the winding 20, the first battery group 11 and the second battery group 12 perform mutual charging and discharging through the winding 20, and the first battery group 11 and the second battery group 12 charge the capacitor 50, so that the first battery group 11 and the second battery group 12 can supply power to the load 100, and the capacitor 50 can also supply power to the load 100.

In other words, in the embodiments of the present disclosure, the controller controls the first switch assembly 30 and the second switch assembly 40 to switch between the on state and the open state, so that it is equivalent to that an alternating current exists between the first battery group 11 and the second battery group 12. An effect of interlacing oscillations can be generated between the first battery group 11 and the second battery group 12 through the alternating current, so that the battery pack 10 can generate heat, to avoid heating the battery pack 10 in an external heating manner. In addition, heating is performed inside the battery pack 10, so that a temperature field distribution of the battery pack 10 can be uniform, thereby improving heating efficiency.

It should be noted that, when the first battery group 11 charges the second battery group 12, the current direction of the first battery group 11 is a first direction. When the second battery group 12 charges the first battery group 11, the current direction of the first battery group 11 is a second direction. The first direction is opposite to the second direction. The first battery group 11 and the second battery group 12 perform alternate charging and discharging, so that the current direction of the first battery group 11 is alternately switched. This is equivalent to that the first battery group 11 has an alternating current, so that the first battery group 11 can perform self-heating. For the self-heating of the second battery group 12, refer to a process of self-heating of the first battery group 11 for details, and details are not described herein again.

It should further be noted that, in the embodiments of the present disclosure, the winding 20 may be an inductor. When the control system is used in an electric transportation means, the electric transportation means includes an electric motor, and a winding 20 of the electric motor may be used as the winding 20 in the control system, i.e., the battery pack 10 is electrically connected to the winding 20 of the electric motor. In addition, the winding 20 may alternatively be another component specifically configured to store energy, or may alternatively be a component configured to carry and transfer energy through an alternating current.

In addition, in the embodiments of the present disclosure, when the control system is used in the electric transportation means, the controller may be a body control module (BCM) in the electric transportation means. Certainly, the controller may alternatively be another controller having a control function in the electric transportation means. This is not limited in the embodiments of the present disclosure.

Figure 3:
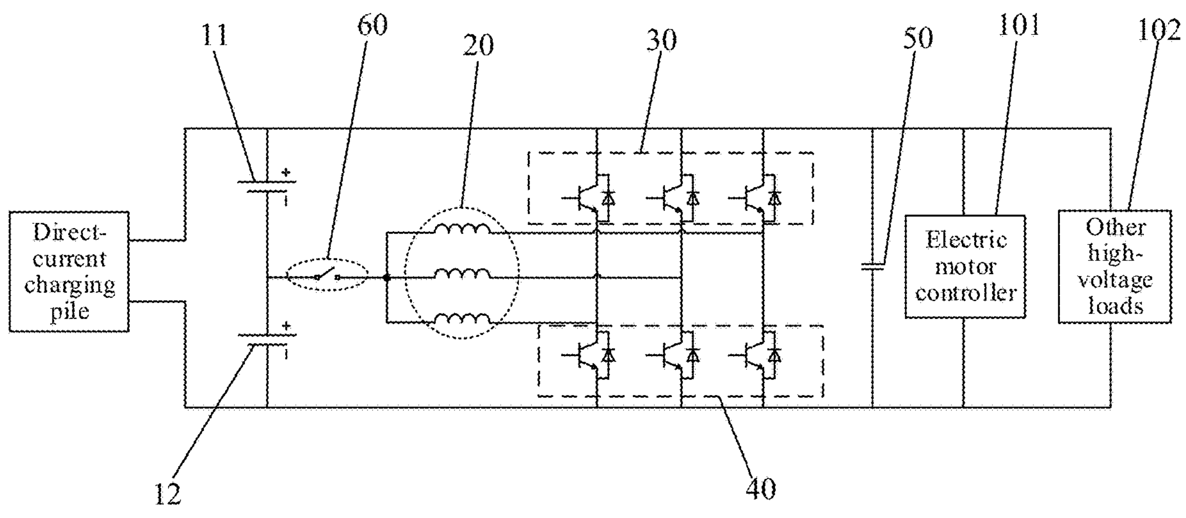
FIG. 3 is a schematic diagram 3 of a battery self-heating control system according to an embodiment of the present disclosure.

In addition, in the embodiments of the present disclosure, the first switch assembly 30 and the second switch assembly 40 may be insulated gate bipolar transistors (IGBTs) or metal-oxide semiconductor field-effect transistors (MOSFETs). Certainly, the first switch assembly 30 and the second switch assembly 40 may alternatively be of other types. For example, the first switch assembly 30 and the second switch assembly 40 may alternatively be other thyristors. In addition, in the embodiments of the present disclosure, when the control system is used in the electric transportation means, as shown in FIG. 3, bridge arms of an electric motor controller in the electric transportation means may also be used as the first switch assembly 30 and the second switch assembly 40, i.e., the battery pack 10 is electrically connected to the bridge arms of the electric motor controller.

In addition, in the embodiments of the present disclosure, the capacitor 50 may be an additional independent capacitor 50. When the control system is used in the electric transportation means, the capacitor 50 may alternatively be integrated with an electric motor controller 101 in the electric transportation means, or the capacitor 50 may alternatively be integrated with other high-voltage loads 102 in the electric transportation means. Certainly, the capacitor 50 may alternatively not be integrated with the electric motor controller 101 or the other high-voltage loads 102. This is not limited in the embodiments of the present disclosure.

In addition, in the embodiments of the present disclosure, when the control system is used in the electric transportation means, the load 100 may be the electric motor controller 101 and the other high-voltage loads 102. Certainly, the load 100 may alternatively be the other high-voltage loads 102 only, or may alternatively be only the electric motor controller 101.

In addition, in the embodiments of the present disclosure, the first switch assembly 30 and the second switch assembly 40 have different conduction states at a same moment. When the first switch assembly 30 is in the on state, the second switch assembly 40 is in the open state, and when the first switch assembly 30 is in the open state, the second switch assembly 40 is in the on state.

In addition, in the embodiments of the present disclosure, both the first battery group 11 and the second battery group 12 may be independent battery packs 10. Certainly, the first battery group 11 and the second battery group 12 may alternatively be two parts of a same battery pack 10. In this case, a center line of the battery pack 10 is led out. In addition, the first battery group 11 may alternatively include a number of battery cores connected in series or in parallel, and the second battery group 12 may alternatively include a number of battery cores connected in series or in parallel. A quantity of battery cores in the first battery group 11 and a quantity of battery cores in the second battery group 12 may be equal, or certainly may be not equal. This is not limited in the embodiments of the present disclosure.

In addition, in some embodiments, as shown in FIG. 4 to FIG. 7, in a case that the control system is in a first state, within a first half cycle of each control cycle of the controller, the controller is configured to control the first switch assembly 30 and the second switch assembly 40 to switch between the on state and the open state, and the first battery group 11 to charge the winding 20 and charge the second battery group 12 through the winding 20. The capacitor 50 and/or the first battery group 11 are/is configured to supply power to the load 100. Within a second half cycle of each control cycle of the controller, the controller is configured to control the first switch assembly 30 and the second switch assembly 40 to switch between the on state and the open state, and the second battery group 12 to charge the winding 20 and charge the first battery group 11 through the winding 20. The capacitor 50 and/or the second battery group 12 are/is configured to supply power to the load 100.

When the control system is in the first state, the control cycle of the controller includes a number of cycles. Within each control cycle, within the first half cycle of each control cycle, the controller controls the first switch assembly 30 and the second switch assembly 40 to switch between the on state and the open state. When the first switch assembly 30 is turned on, the second switch assembly 40 is turned off, and when the first switch assembly 30 is turned off, the second switch assembly 40 is turned on. Therefore, voltages of the first battery group 11 and the second battery group 12 are different, and the first battery group 11 charges the winding 20 and charges the second battery group 12 through the winding 20. In addition, when the first battery group 11 charges the winding 20, electric energy of the first battery group 11 is also transferred to the capacitor 50, so that the capacitor 50 and/or the first battery group 11 also charge/charges the load. Within the second half cycle of each control cycle, the controller controls the first switch assembly 30 and the second switch assembly 40 to switch between the on state and the open state. When the first switch assembly 30 is turned on, the second switch assembly 40 is turned off, and when the first switch assembly 30 is turned off, the second switch assembly 40 is turned on. Therefore, the voltages of the first battery group 11 and the second battery group 12 are different, and the second battery group 12 charges the winding 20 and charges the first battery group 11 through the winding 20. In addition, when the second battery group 12 charges the winding 20, electric energy of the second battery group 12 is also transferred to the capacitor 50, so that the capacitor 50 and/or the second battery group 12 also charge/charges the load.

Specifically, the first half cycle may include a first time period and a second time period, the second half cycle may include a third time period and a fourth time period, the first time period and the second time period form a complete first half cycle, and the third time period and the fourth time period form a complete second half cycle.

Within the first time period of the first half cycle, the controller controls the first switch assembly 30 to be in a closed state and the second switch assembly 40 to be in the open state, the first battery group 11 to charge the winding 20, and the capacitor 50 to supply power to the load. Within the second time period of the first half cycle, the controller controls the first switch assembly 30 to be in the open state and the second switch assembly 40 to be in the closed state, the winding 20 to charge the second battery group 12, and the first battery group 11 and the capacitor 50 to supply power to the load.

Figure 4:
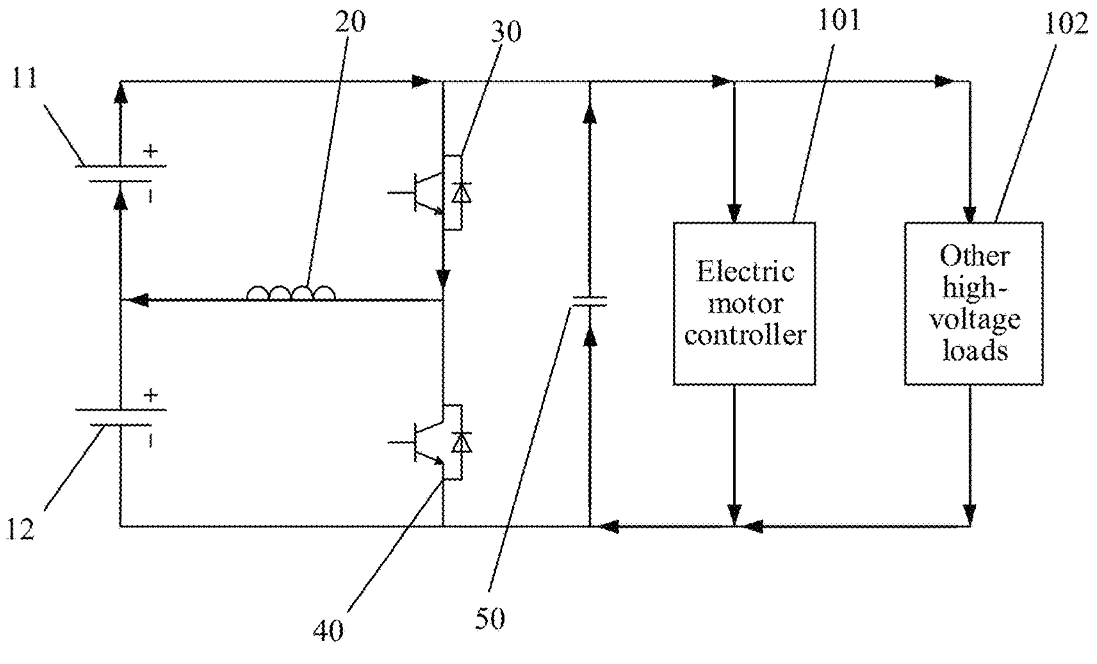
FIG. 4 is a schematic diagram 1 of a current flow direction in a first state according to an embodiment of the present disclosure.
Figure 5:
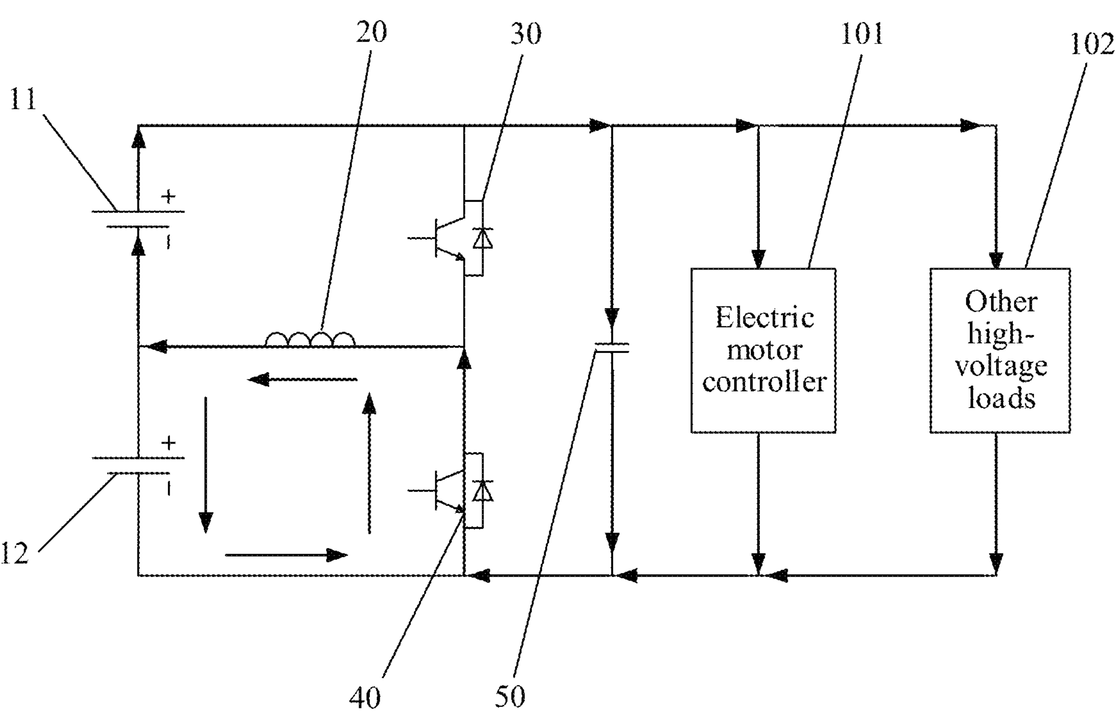
FIG. 5 is a schematic diagram 2 of a current flow direction in a first state according to an embodiment of the present disclosure.

As shown in FIG. 4, when the first switch assembly 30 is controlled to be in the closed state and the second switch assembly 40 is controlled to be in the open state within the first time period, in this case, the voltage of the first battery group 11 is greater than the voltage of the second battery group 12, and the first battery group 11 charges the winding 20, so that the winding 20 can store electric energy, and the electric energy stored in the capacitor 50 is used to supply power to the load 100. As shown in FIG. 5, when the first switch assembly 30 is in the open state and the second switch assembly 40 is in the closed state within the second time period, in this case, it is equivalent to that the first battery group 11 is connected in series to the winding 20, so that the first battery group 11 and the winding 20 jointly supply power to the load 100, and the winding 20 charges the second battery group 12. When the controller controls the first switch assembly 30 to cycle states within the first time period and the second time period and the second switch assembly 40 to cycle states within the first time period and the second time period, it is equivalent to that the first switch assembly 30, the second switch assembly 40, the winding 20, and the capacitor 50 form a boost circuit, so that the first battery group 11 supplies power to the load 100 through the boost circuit, the first battery group 11 continuously discharges to the second battery group 12, and the second battery group 12 is continuously charged.

Within the third time period of the second half cycle, the controller controls the first switch assembly to be in the open state, and controls the second switch assembly to be in the closed state, the second battery group to charge the winding, and the capacitor to supply power to the load. Within the fourth time period of the second half cycle, the controller controls the first switch assembly to be in the closed state and the second switch assembly to be in the open state, the winding to charge the first battery group, and the second battery group and the capacitor to supply power to the load.

Figure 6:
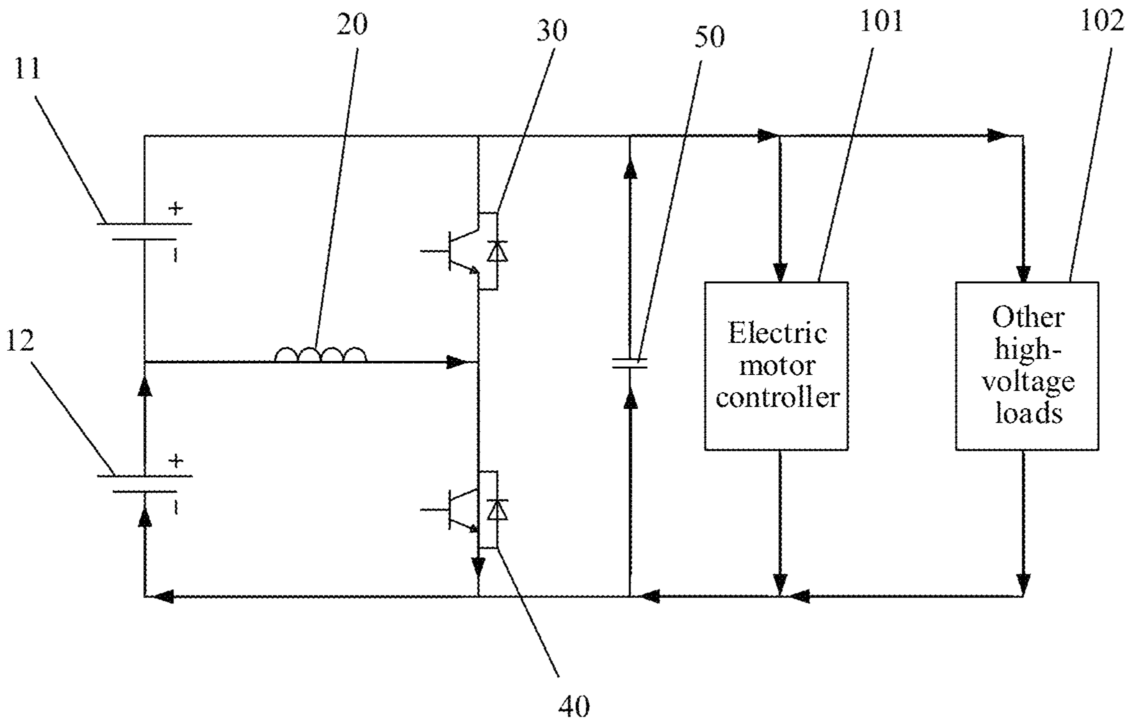
FIG. 6 is a schematic diagram 3 of a current flow direction in a first state according to an embodiment of the present disclosure.
Figures 7, 8:
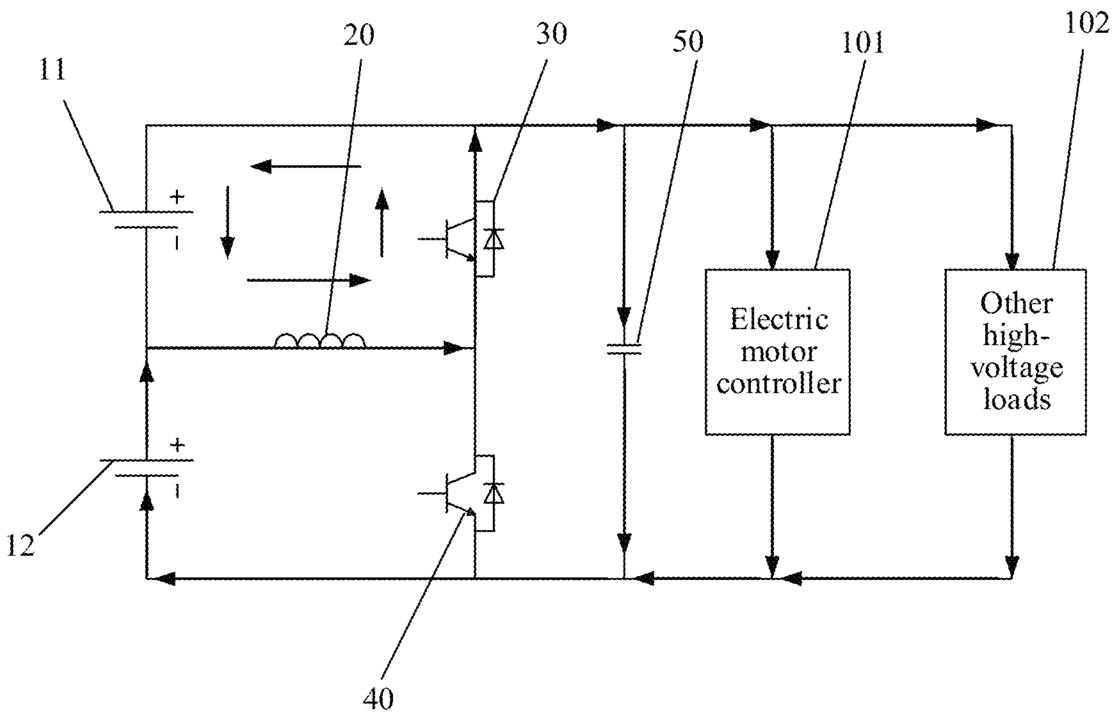
FIG. 7 is a schematic diagram 4 of a current flow direction in a first state according to an embodiment of the present disclosure.
FIG. 8 is a schematic diagram 1 of a current flow direction in a second state according to an embodiment of the present disclosure.

Within the third time period, the controller controls the first switch assembly 30 to be in the open state, and the second switch assembly 40 to be in the closed state. Within the fourth time period, the controller controls the first switch assembly 30 to be in the closed state, and the second switch assembly 40 to be in the open state. As shown in FIG. 6, when the first switch assembly 30 is in the open state and the second switch assembly 40 is in the closed state within the third time period, in this case, after the first battery group 11 is continuously charged, the voltage of the second battery group 12 is greater than the voltage of the first battery group 11, and the second battery group 12 charges the winding 20, so that the winding 20 can store electric energy, and the electric energy stored in the capacitor 50 is used to supply power to the load 100. As shown in FIG. 7, when the first switch assembly 30 is in the closed state and the second switch assembly 40 is in the open state within the fourth time period, in this case, it is equivalent to that the second battery group 12 is connected in series to the winding 20, so that the second battery group 12 and the winding 20 jointly supply power to the load 100, and the winding 20 charges the first battery group 11. When the controller controls the first switch assembly 30 to cycle states within the third time period and the fourth time period and the second switch assembly 40 to cycle states within the third time period and the fourth time period, it is equivalent to that the first switch assembly 30, the second switch assembly 40, the winding 20, and the capacitor 50 form a boost circuit, so that the second battery group 12 supplies power to the load 100 through the boost circuit, the second battery group 12 continuously discharges to the first battery group 11, and the first battery group 11 is continuously charged.

When the controller controls the first switch assembly 30 and the second switch assembly 40 in a number of control cycles, it is equivalent to that each control cycle is cycled, i.e., states of the first switch assembly 30 and the second switch assembly 40 are cycled within the control cycles, so that the first battery group 11 and the second battery group 12 perform alternate charging and discharging. To be specific, within the first time period and the second time period of the first half cycle of each control cycle, the first battery group 11 discharges to the second battery group 12, and the second battery group 12 is charged. Within the third time period and the fourth time period of the second half cycle, the second battery group 12 discharges to the first battery group 11, and the first battery group 11 is charged. In addition, when the first battery group 11 and the second battery group 12 perform alternate charging and discharging, it is equivalent to that an alternating current exists between the first battery group 11 and the second battery group 12, so that the battery pack 10 can perform self-heating.

In addition, when the control cycle of the controller is cycled, i.e., after the first time period, the second time period, the third time period, and the fourth time period, the control of the first switch assembly 30 and the second switch assembly 40 within the first time period, the second time period, the third time period, and the fourth time period is repeated. Within one control cycle, in a fourth time period of a previous control cycle before the control cycle, the second battery group 12 charges the first battery group 11, so that the voltage of the first battery group 11 is greater than the voltage of the second battery group 12. After the cycle, within a first time period of a current control cycle, the first battery group 11 charges the second battery group 12, and then the cycle is repeated.

For example, a first control cycle is adjacent to a second control cycle, the second control cycle is a current control cycle, and the first control cycle is a control cycle before the second control cycle. Within a fourth time period of the first control cycle, the second battery group 12 charges the first battery group 11, so that the voltage of the first battery group 11 is greater than the voltage of the second battery group 12. Next, a first time period of the second control cycle is entered, and the first battery group 11 charges the second battery group 12.

It should be noted that each control cycle may have a short time. For example, duration of the control cycle is 1 millisecond. In addition, the first time period, the second time period, the third time period, and the fourth time period form a complete control cycle. To be specific, the first time period and the second time period form the first half cycle, the third time period and the fourth time period form the second half cycle, and the first half cycle and the second half cycle form a complete control cycle.

In addition, in the embodiments of the present disclosure, when the control system is used in the electric transportation means, the first state may be a state in which the electric transportation means is in a driving self-heating state, i.e., the first state is the driving self-heating state. This is equivalent to self-heating of the battery pack 10 during driving, i.e., during traveling, of the electric transportation means.

In addition, in some embodiments, as shown in FIG. 8 to FIG. 11, if a battery level of the first battery group 11 is different from a battery level of the second battery group 12, the control system is in a second state. In a case that the control system is in the second state, the battery level of the first battery group 11 is greater than the battery level of the second battery group 12. Within the first time period of each control cycle, the controller controls the first switch assembly 30 and the second switch assembly 40 to switch between the on state and the open state, and controls the first switch assembly 30 to be in the closed state and the second switch assembly 40 to be in the open state, the first battery group 11 to charge the winding 20, and the first battery group 11, the second battery group 12, and the capacitor 50 to supply power to the load 100. Within the second time period of each control cycle, the controller controls the first switch assembly 30 to be in the open state and the second switch assembly 40 to be in the closed state, the winding 20 to charge the second battery group 12, and the first battery group 11 and the second battery group 12 to supply power to the capacitor 50 and the load 100. In addition, in a case that the control system is in the second state, the battery level of the second battery group 12 is greater than the battery level of the first battery group 11. Within the third time period of each control cycle, the controller controls the first switch assembly 30 to be in the open state, and controls the second switch assembly 40 to be in the closed state, the second battery group 12 to charge the winding 20, and the first battery group 11, the second battery group 12, and the capacitor 50 to supply power to the load 100. Within the fourth time period, the controller controls the first switch assembly 30 to be in the closed state and the second switch assembly 40 to be in the open state, the winding 20 to charge the first battery group 11, and the first battery group 11 and the second battery group 12 to supply power to the capacitor and the load 100.

When the control system is used in the electric transportation means, the second state may be a balanced state, i.e., the battery levels of the first battery group 11 and the second battery group 12 are balanced. For example, during driving, if the battery levels of the first battery group 11 and the second battery group 12 are different, a balancing function may be activated, so that the electric transportation means is in the balanced state.

Figure 9:
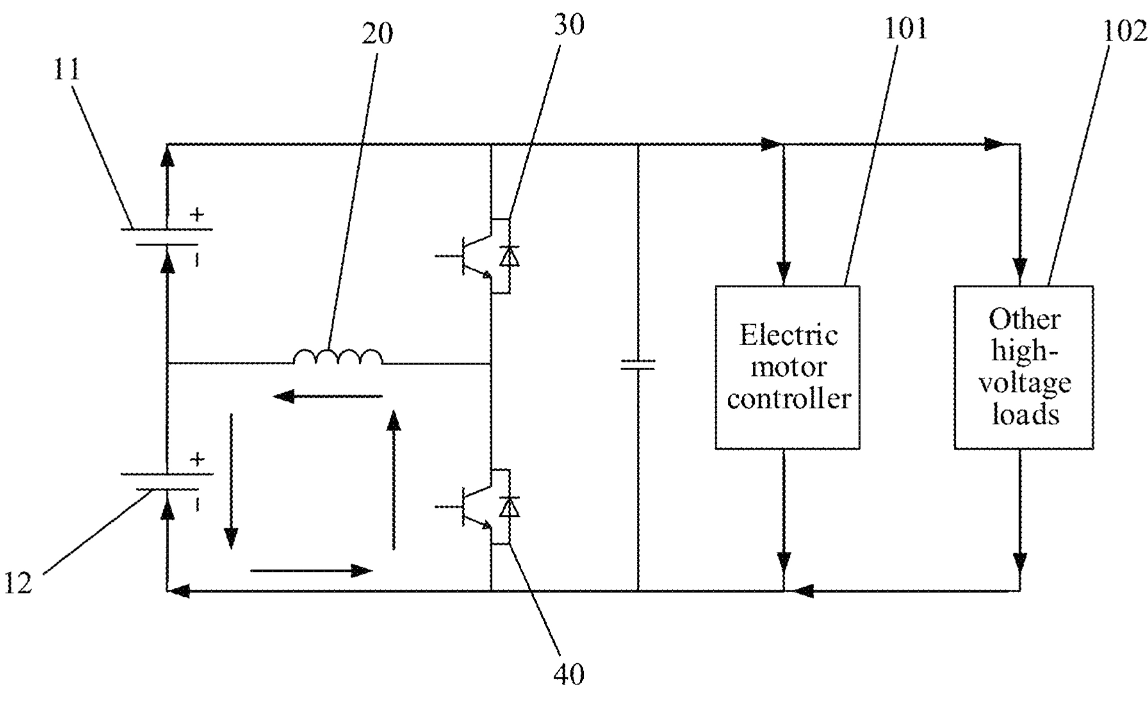
FIG. 9 is a schematic diagram 2 of a current flow direction in a second state according to an embodiment of the present disclosure.

In addition, if the battery level of the first battery group 11 is greater than the battery level of the second battery group 12, as shown in FIG. 8, within the first time period, the controller controls the first switch assembly 30 to be in the closed state, and the second switch assembly 40 to be in the open state. In this case, the first battery group 11 is connected in series to the first switch assembly 30, and charges the winding 20 through the first switch assembly 30. In addition, the first battery group 11 is connected in series to the second battery group 12, the first battery group 11 and the second battery group 12 supply power to the load 100, and the capacitor 50 also supplies power to the load 100. As shown in FIG. 9, within the second time period, the controller controls the first switch assembly 30 to be in the open state, and the second switch assembly 40 to be in the closed state. In this case, the winding 20 and the second battery group 12 form a complete path through the second switch assembly 40, and the winding 20 charges the second battery group 12. In addition, the first battery group 11 is connected in series to the second battery group 12, and the first battery group 11 and the second battery group 12 supply power to the load 100, and charges the capacitor 50.

It should be noted that the first time period and the second time period may form a control cycle, and the first time period and the second time period are alternately cycled, so that the first battery group 11 continuously discharges to the second battery group 12, and finally, the battery levels of the first battery group 11 and the second battery group 12 are balanced, and the first battery group 11 and the second battery group 12 supply power to the load 100.

Figure 10:
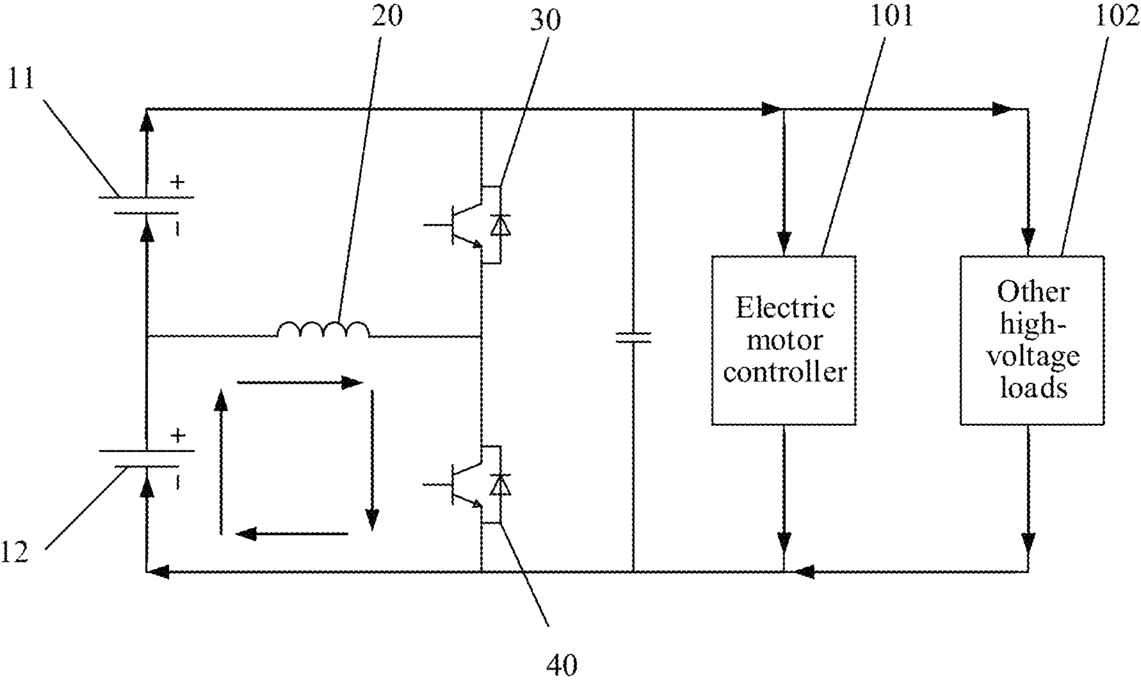
FIG. 10 is a schematic diagram 3 of a current flow direction in a second state according to an embodiment of the present disclosure.
Figures 11, 12:
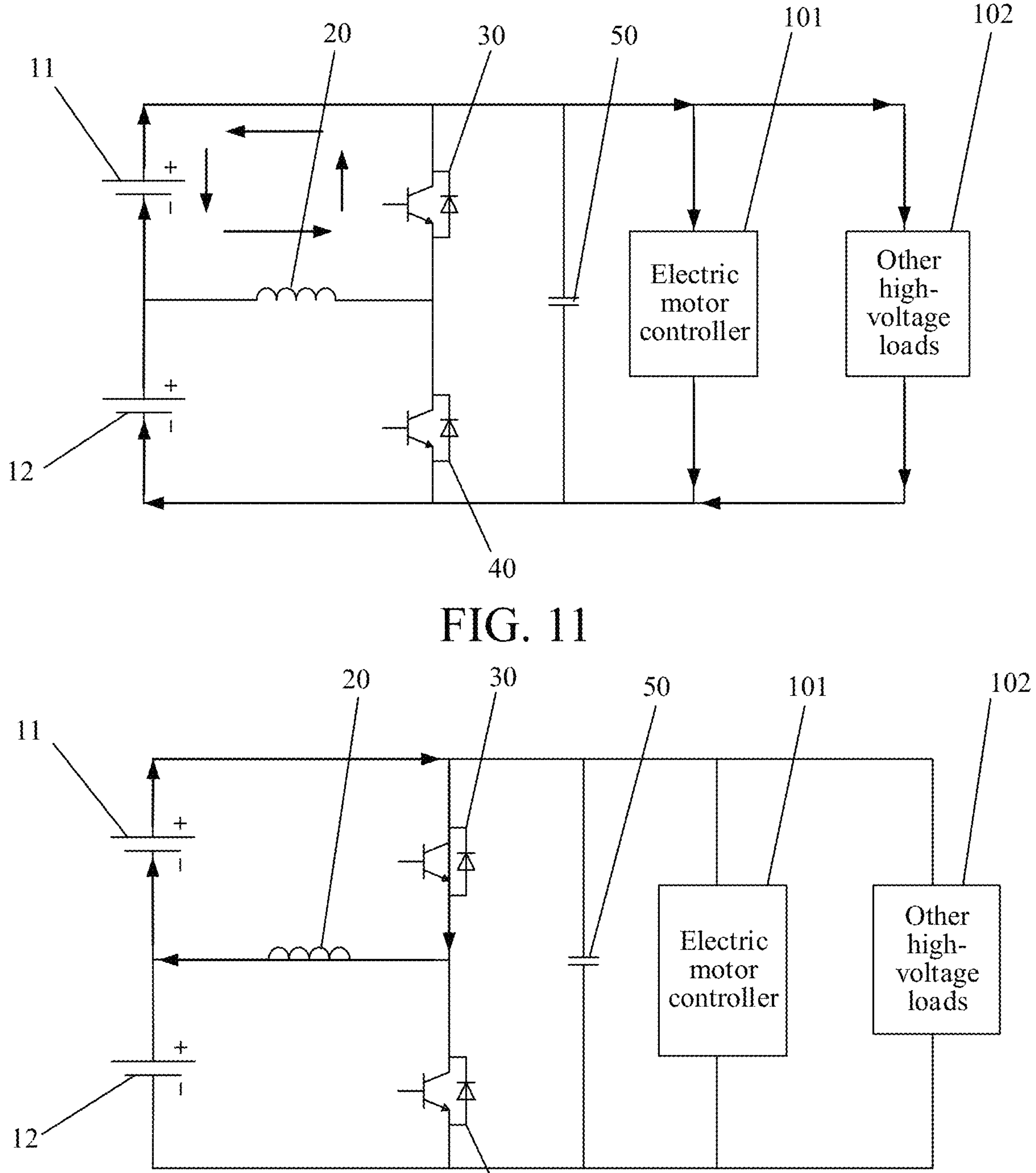
FIG. 11 is a schematic diagram 4 of a current flow direction in a second state according to an embodiment of the present disclosure.
FIG. 12 is a schematic diagram 1 of a current flow direction in a third state according to an embodiment of the present disclosure.

In addition, if the battery level of the second battery group 12 is greater than the battery level of the first battery group 11, as shown in FIG. 10, within the third time period, the controller controls the first switch assembly 30 to be in the open state, and the second switch assembly 40 to be in the closed state. In this case, the second battery group 12 is connected in series to the second switch assembly 40, and charges the winding 20 through the second switch assembly 40. In addition, the second battery group 12 is connected in series to the first battery group 11, the second battery group 12 and the first battery group 11 supply power to the load 100, and the capacitor 50 also supplies power to the load 100. As shown in FIG. 11, within the fourth time period, the controller controls the first switch assembly 30 to be in the closed state, and the second switch assembly 40 to be in the open state. In this case, the winding 20 and the first battery group 11 form a complete path through the first switch assembly 30, and the winding 20 charges the first battery group 11. In addition, the first battery group 11 is connected in series to the second battery group 12, and the first battery group 11 and the second battery group 12 supply power to the load 100, and charges the capacitor 50.

It should be noted that the third time period and the fourth time period may form a control cycle, and the third time period and the fourth time period are alternately cycled, so that the second battery group 12 continuously discharges to the first battery group 11, and finally, the battery levels of the second battery group 12 and the first battery group 11 are balanced, and the first battery group 11 and the second battery group 12 supply power to the load 100.

In the embodiments of the present disclosure, if the battery level of the first battery group 11 is greater than the battery level of the second battery group 12, the controller alternately cyclically controls the first switch assembly 30 and the second switch assembly 40 in the first time period and the second time period, so that the first battery group 11 continuously discharges to the second battery group 12, and the battery levels of the first battery group 11 and the second battery group 12 are balanced. If the battery level of the second battery group 12 is greater than the battery level of the first battery group 11, the controller alternately cyclically controls the first switch assembly 30 and the second switch assembly 40 in the third time period and the fourth time period, so that the second battery group 12 continuously discharges to the first battery group 11, and the battery levels of the second battery group 12 and the first battery group 11 are balanced.

In addition, in some embodiments, as shown in FIG. 12 to FIG. 15, in a case that the control system is in a third state, within each control cycle of the controller, within the first time period, the controller controls the first switch assembly 30 to be in the closed state, the second switch assembly 40 to be in the open state, and the first battery group 11 to charge the winding 20. Within the second time period, the controller controls the first switch assembly 30 to be in the open state, the second switch assembly 40 to be in the closed state, and the winding 20 to charge the second battery group 12. Within the third time period, the controller controls the first switch assembly 30 to be in the open state, and controls the second switch assembly 40 to be in the closed state, and the second battery group 12 to charge the winding 20. Within the fourth time period, the controller controls the first switch assembly 30 to be in the closed state, the second switch assembly 40 to be in the open state, and the winding 20 to charge the first battery group 11.

When the control system is used in the electric transportation means, the third state may be a parking heating state, i.e., a state in which the electric transportation means stops driving and the battery pack 10 performs self-heating. For example, when the electric transportation means stops at a roadside and the battery pack 10 needs to perform self-heating, a parking heating function is activated, and the control system is in the third state.

Figure 13:
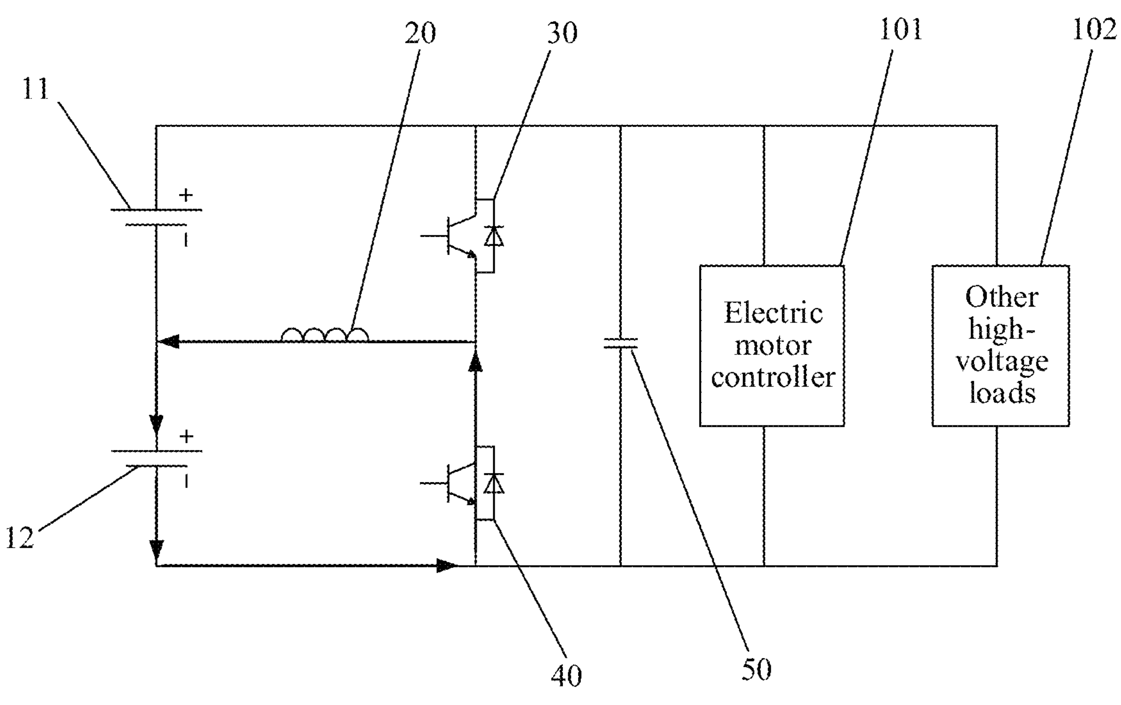
FIG. 13 is a schematic diagram 2 of a current flow direction in a third state according to an embodiment of the present disclosure.

In addition, when the control system is in the first state, the control cycle of the controller includes a number of cycles. Within each control cycle, within the first time period, the controller controls the first switch assembly 30 to be in the closed state, and the second switch assembly 40 to be in the open state. Within the second time period, the controller controls the first switch assembly 30 to be in the open state, and the second switch assembly 40 to be in the closed state. As shown in FIG. 12, when the first switch assembly 30 is in the closed state and the second switch assembly 40 is in the open state within the first time period, in this case, the voltage of the first battery group 11 is greater than the voltage of the second battery group 12, and the first battery group 11 charges the winding 20, so that the winding 20 can store electric energy. As shown in FIG. 13, within the second time period, the first switch assembly 30 is in the open state, and the second switch assembly 40 is in the closed state. In this case, the winding 20 and the second battery group 12 form a complete path through the second switch assembly 40, and the winding 20 charges the second battery group 12. When the controller controls the first switch assembly 30 to cycle states within the first time period and the second time period and the second switch assembly 40 to cycle states within the first time period and the second time period, the first battery group 11 continuously discharges to the second battery group 12, and the second battery group 12 is continuously charged.

Figure 14:
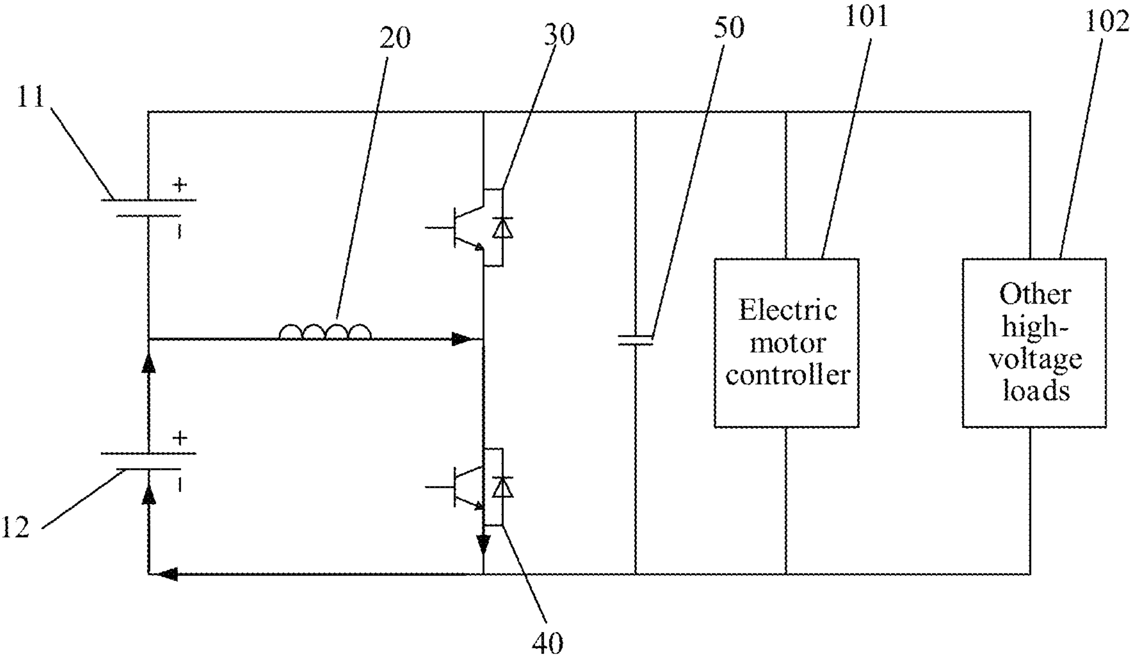
FIG. 14 is a schematic diagram 3 of a current flow direction in a third state according to an embodiment of the present disclosure.
Figure 15:
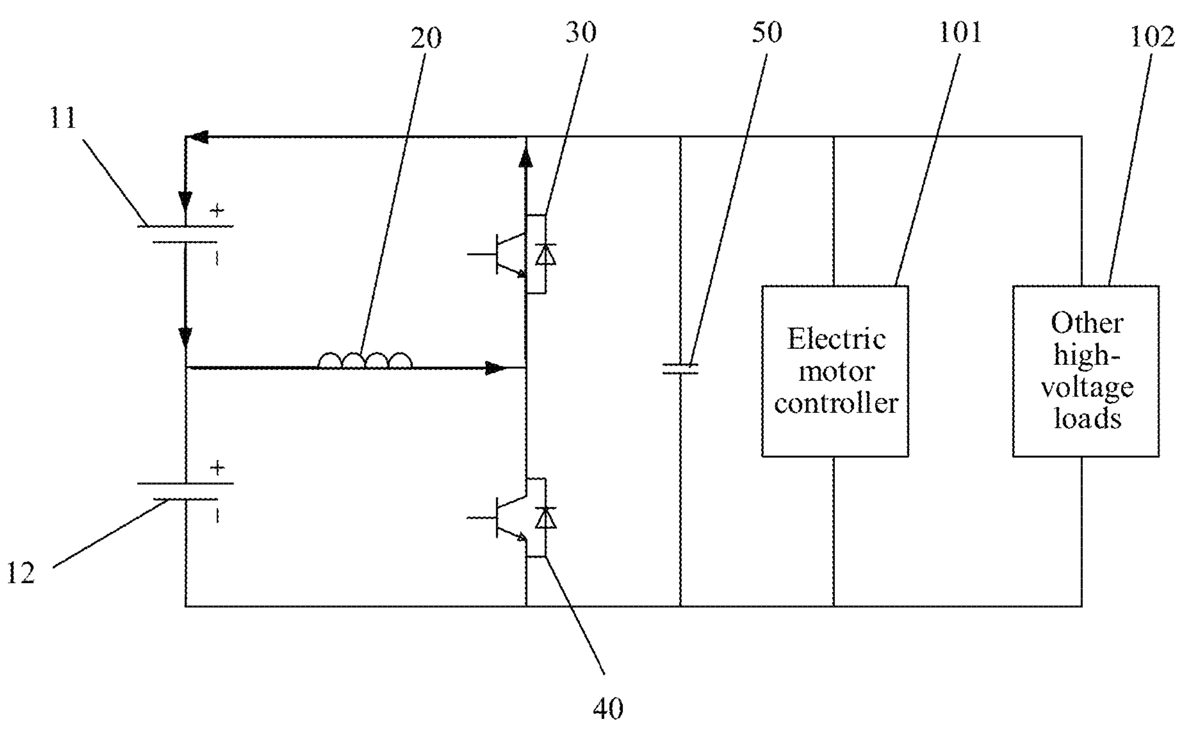
FIG. 15 is a schematic diagram 4 of a current flow direction in a third state according to an embodiment of the present disclosure.

Within the third time period, the controller controls the first switch assembly 30 to be in the open state, and the second switch assembly 40 to be in the closed state. Within the fourth time period, the controller controls the first switch assembly 30 to be in the closed state, and the second switch assembly 40 to be in the open state. As shown in FIG. 14, when the first switch assembly 30 is in the open state and the second switch assembly 40 is in the closed state within the third time period, in this case, after the first battery group 11 is continuously charged, the voltage of the second battery group 12 is greater than the voltage of the first battery group 11, and the second battery group 12 charges the winding 20, so that the winding 20 can store electric energy, and the electric energy stored in the capacitor 50 is used to supply power to the load 100. As shown in FIG. 15, within the fourth time period, the first switch assembly 30 is in the closed state, and the second switch assembly 40 is in the open state. In this case, the winding 20 and the first battery group 11 form a complete path through the first switch assembly 30, and the winding 20 charges the first battery group 11. When the controller controls the first switch assembly 30 to cycle states within the third time period and the fourth time period and the second switch assembly 40 to cycle states within the third time period and the fourth time period, the second battery group 12 continuously discharges to the first battery group 11, and the first battery group 11 is continuously charged.

When the controller controls the first switch assembly 30 and the second switch assembly 40 in a number of control cycles, it is equivalent to that each control cycle is cycled, i.e., states of the first switch assembly 30 and the second switch assembly 40 are cycled within the control cycles, so that the first battery group 11 and the second battery group 12 perform alternate charging and discharging. To be specific, within the first time period and the second time period of each control cycle, the first battery group 11 discharges to the second battery group 12, and the second battery group 12 is charged. Within the third time period and the fourth time period, the second battery group 12 discharges to the first battery group 11, and the first battery group 11 is charged. In addition, when the first battery group 11 and the second battery group 12 perform alternate charging and discharging, it is equivalent to that an alternating current exists between the first battery group 11 and the second battery group 12, so that the battery pack 10 can perform self-heating.

In addition, when the control cycle of the controller is cycled, i.e., after the first time period, the second time period, the third time period, and the fourth time period, the control of the first switch assembly 30 and the second switch assembly 40 within the first time period, the second time period, the third time period, and the fourth time period is repeated. Within one control cycle, in a fourth time period of a previous control cycle before the control cycle, the second battery group 12 charges the first battery group 11, so that the voltage of the first battery group 11 is greater than the voltage of the second battery group 12. After the cycle, within a first time period of a current control cycle, the first battery group 11 charges the second battery group 12, and then the cycle is repeated.

For example, a first control cycle is adjacent to a second control cycle, the second control cycle is a current control cycle, and the first control cycle is a control cycle before the second control cycle. Within a fourth time period of the first control cycle, the second battery group 12 charges the first battery group 11, so that the voltage of the first battery group 11 is greater than the voltage of the second battery group 12. Next, a first time period of the second control cycle is entered, and the first battery group 11 charges the first battery group 11.

In addition, in some embodiments, as shown in FIG. 16 to FIG. 19, in a case that the second battery group 12 is damaged, the controller controls the first switch assembly 30 and the second switch assembly 40 to be alternately in the on state, so that the winding 20, the first switch assembly 30, the second switch assembly 40, and the capacitor 50 form a boost circuit, and the first battery group 11 supplies power to the load 100 through the boost circuit. In a case that the first battery group 11 is damaged, the controller controls the first switch assembly 30 and the second switch assembly 40 to be alternately in the on state, and makes the winding 20, the first switch assembly 30, the second switch assembly 40, and the capacitor 50 form a boost circuit. The second battery group 12 supplies power to the load 100 through the boost circuit.

Figure 16:
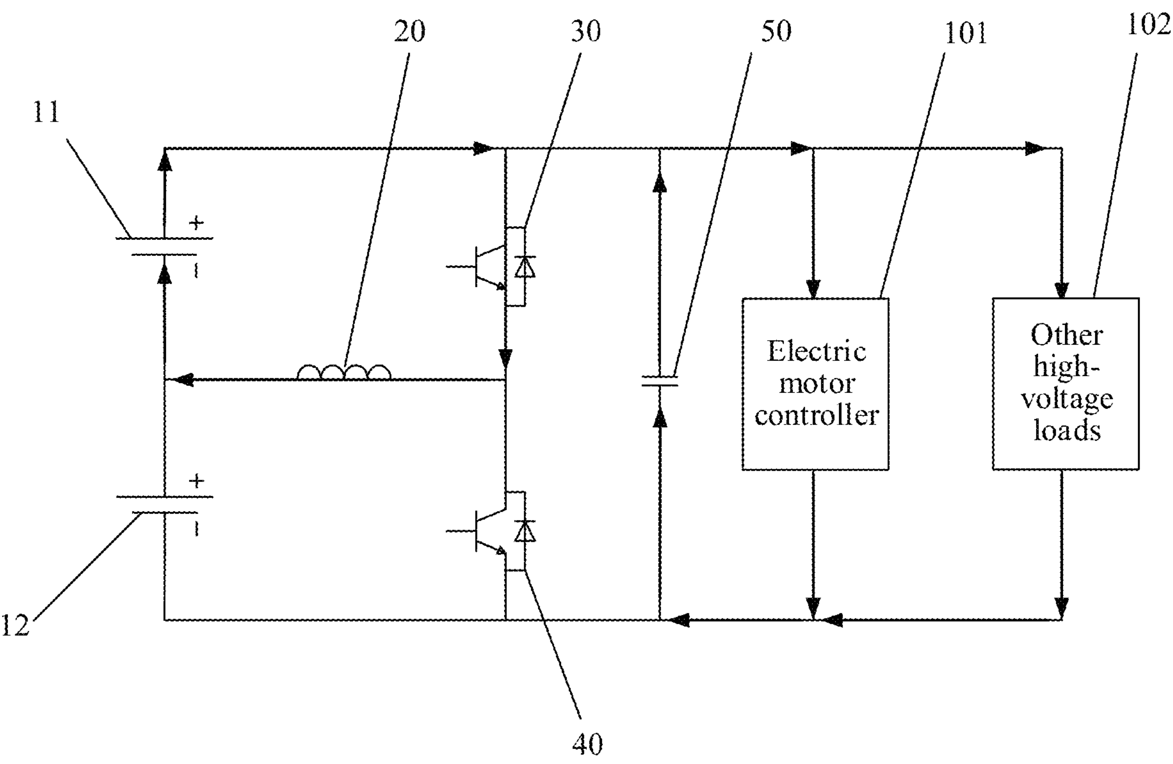
FIG. 16 is a schematic diagram 1 of a current flow direction when a second battery group is damaged according to an embodiment of the present disclosure.
Figure 17:
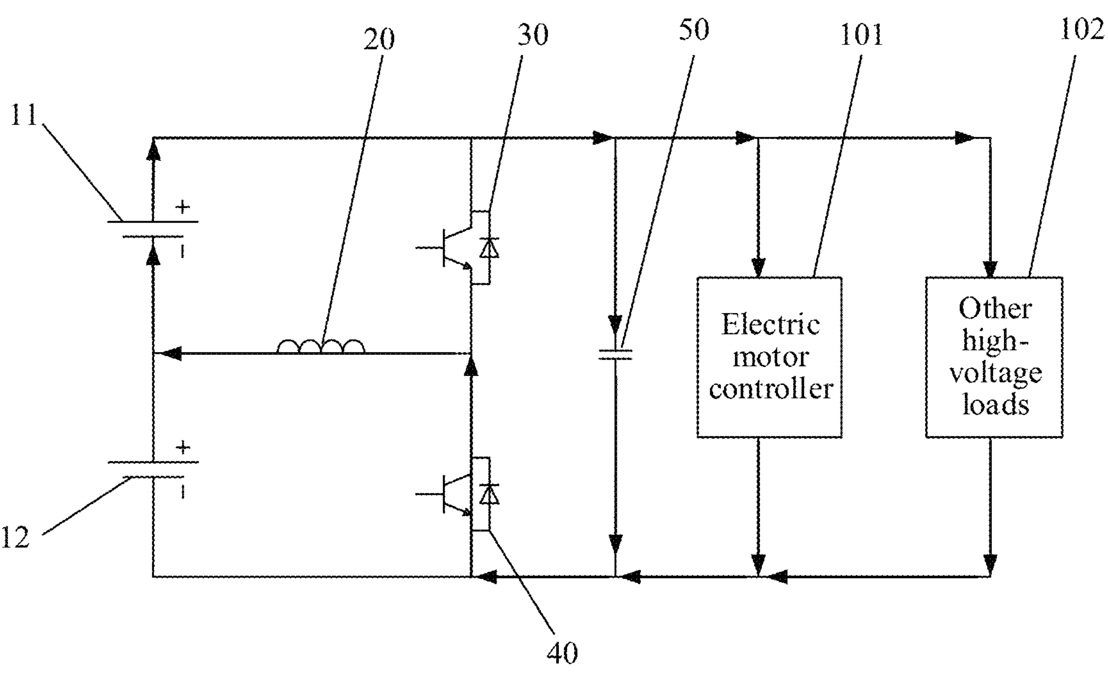
FIG. 17 is a schematic diagram 2 of a current flow direction when a second battery group is damaged according to an embodiment of the present disclosure.

When the second battery group 12 is damaged, in this case, the second battery group 12 cannot supply power to the load 100, and the first battery group 11 supplies power to the load 100 only. The controller controls the first switch assembly 30 and the second switch assembly 40 to be alternately in the on state. As shown in FIG. 16, within the first time period, the first switch assembly 30 is in the closed state and the second switch assembly 40 is in the on state, the first battery group 11 charges the winding 20 through the first switch assembly 30, and electric energy stored in the capacitor 50 is used to supply power to the load 100. As shown in FIG. 17, within the second time period, the first switch assembly 30 is in the open state, the second switch assembly 40 is in the on state, the first battery group 11 is connected in series to the winding 20 to charge the capacitor 50 and supply power to the load 100. That is, the first switch assembly 30 is switched between the on state and the open state, and the second switch assembly 40 is switched between the on state and the open state. When the first switch assembly 30 is turned on, the second switch assembly 40 is turned off, and when the first switch assembly 30 is turned off, the second switch assembly 40 is turned on, so that the winding 20, the first switch assembly 30, the second switch assembly 40, and the capacitor 50 can form a boost circuit, the voltage of the first battery group 11 can be boosted to meet a voltage required by the load 100, i.e., the first battery group 11 supplies power to the load 100.

Figure 18:
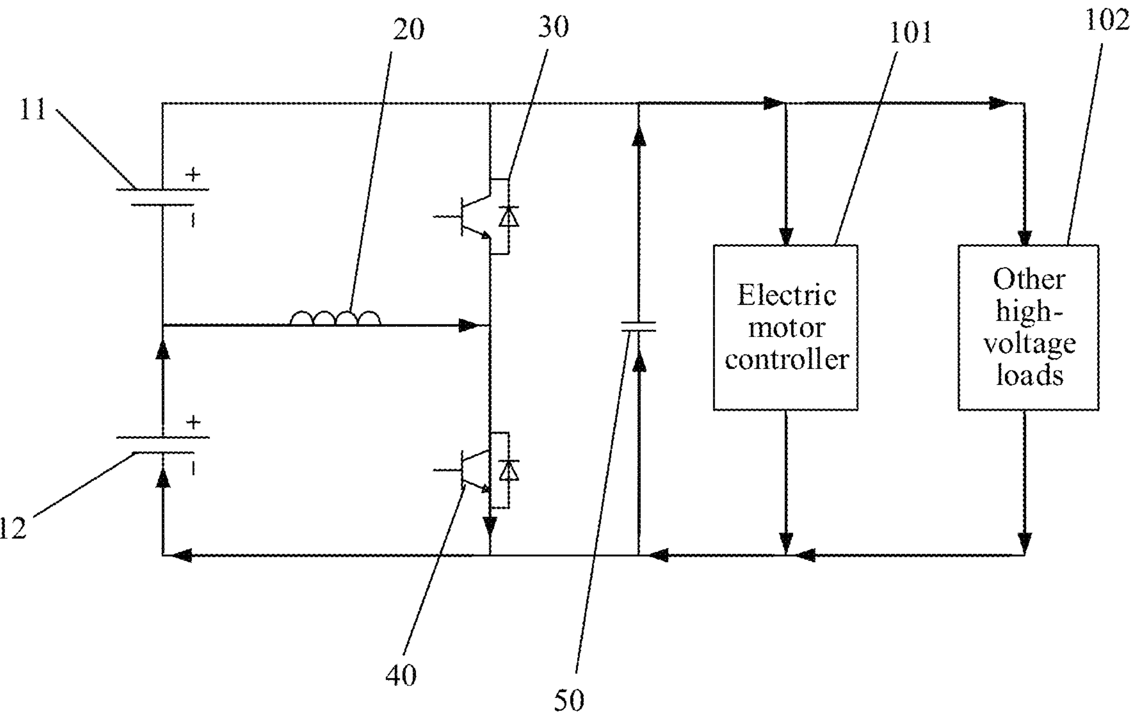
FIG. 18 is a schematic diagram 1 of a current flow direction when a first battery group is damaged according to an embodiment of the present disclosure.
Figure 19:
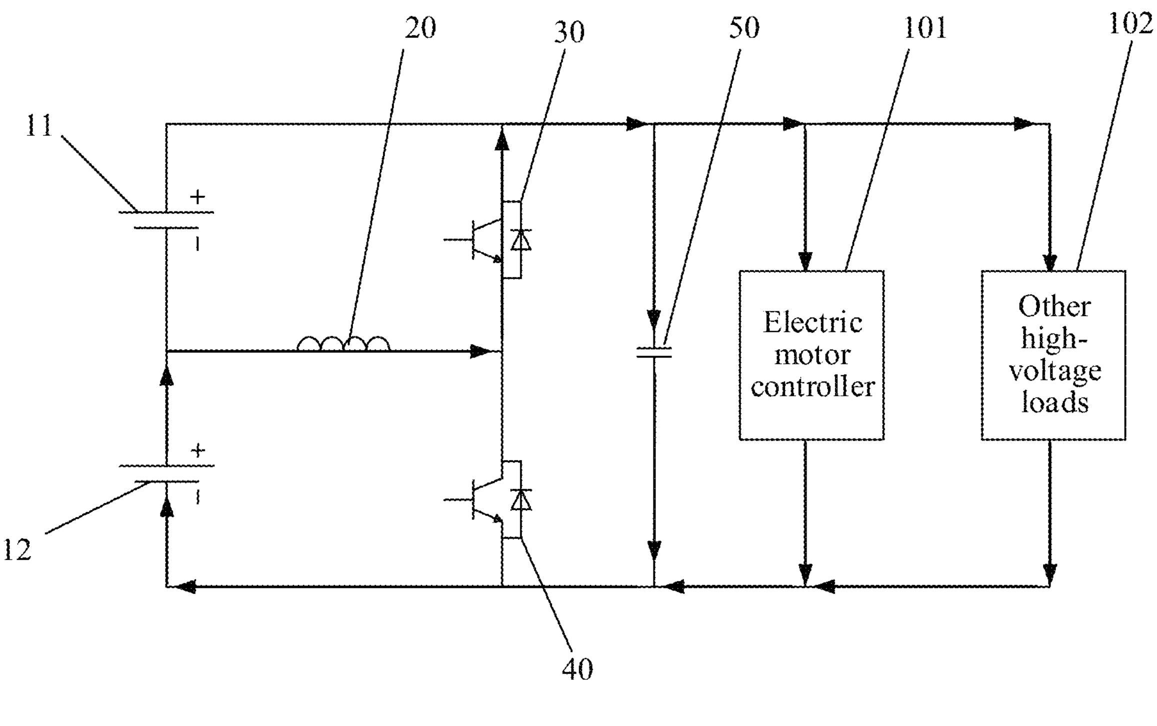
FIG. 19 is a schematic diagram 2 of a current flow direction when a first battery group is damaged according to an embodiment of the present disclosure.

Similarly, when the first battery group 11 is damaged, in this case, the first battery group 11 cannot supply power to the load 100, and only the second battery group 12 supplies power to the load 100. The controller controls the first switch assembly 30 and the second switch assembly 40 to be alternately in the on state. As shown in FIG. 18, within the third time period, the first switch assembly 30 is in the open state and the second switch assembly 40 is in the on state, the second battery group 12 charges the winding 20 through the second switch assembly 40, and electric energy stored in the capacitor 50 is used to supply power to the load 100. As shown in FIG. 19, within the fourth time period, the first switch assembly 30 is in the on state, the second switch assembly 40 is in the open state, the second battery group 12 is connected in series to the winding 20 to charge the capacitor 50 and supply power to the load 100. That is, the first switch assembly 30 is switched between the on state and the open state, and the second switch assembly 40 is switched between the on state and the open state. When the first switch assembly 30 is turned on, the second switch assembly 40 is turned off, and when the first switch assembly 30 is turned off, the second switch assembly 40 is turned on, so that the winding 20, the first switch assembly 30, the second switch assembly 40, and the capacitor 50 can form a boost circuit, the voltage of the second battery group 12 can be boosted to meet a voltage required by the load 100, i.e., the second battery group 12 supplies power to the load 100.

Figure 2:
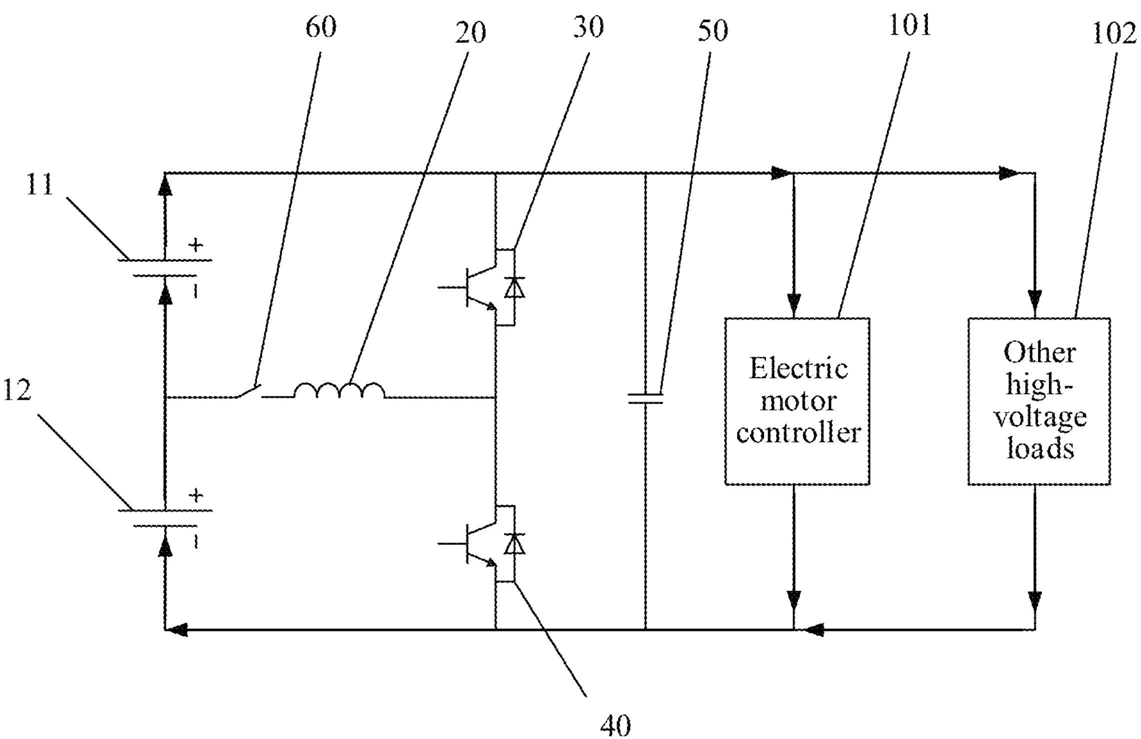
FIG. 2 is a schematic diagram 2 of a battery self-heating control system according to an embodiment of the present disclosure.

In addition, in some embodiments, as shown in FIG. 2 or FIG. 3, a switch device 60 is arranged on the connection line. The switch device 60 is electrically connected to the controller. The controller is configured to control the switch device 60 to be in the on state or the open state. When the switch device 60 is in the on state, the battery pack 10 supplies power to the load 100 and performs self-heating. In a case that the switch device 60 is in the open state, the battery pack 10 supplies power to the load 100 only.

When the switch device 60 is arranged on the connection line and the switch device 60 is electrically connected to the controller, in this case, when only the battery pack 10 needs to supply power to the load 100, as shown in FIG. 2, the controller controls the switch device 60 to be in the open state, and the first battery group 11 and the second battery group 12 are connected in series to supply power to the load 100. When the battery pack 10 needs to perform self-heating and supply power to the load 100, the controller controls the switch device 60 to be in the on state, and controls the first switch assembly 30 and the second switch assembly 40 to be alternately switched between the on state and the open state, so that the battery pack 10 performs self-heating and can supply power to the load 100. In other words, the switch device 60 is arranged on the connection line, so that functional diversity of the control system can be achieved.

It should be noted that the switch device 60 may be IGBTs or MOSFETs. A specific type of the switch device 60 is not limited in the embodiments of the present disclosure.

In the embodiments of the present disclosure, the connection line led out between the first battery group 11 and the second battery group 12 is connected to one end of the winding 20. The first switch assembly 30 and the second switch assembly 40 are connected in series. The first switch assembly 30 is electrically connected to the positive electrode of the first battery group 11 and the first end of the capacitor 50. The second switch assembly 40 is electrically connected to the negative electrode of the second battery group 12 and the second end of the capacitor 50. The first end and the second end of the capacitor 50 are used for connecting to the load 100. Therefore, the first switch assembly 30 and the second switch assembly 40 may be switched between the on state and the open state, so that the first battery group 11 and the second battery group 12 can charge or discharge each other. After the first battery group 11 charges the second battery group 12, the first battery group 11 may be charged through the second battery group 12, so that a current direction of the first battery group 11 changes periodically, and a current direction of the second battery group 12 changes periodically, which is equivalent to that an alternating current exists between the first battery group 11 and the second battery group 12. The controller is electrically connected to the first switch assembly 30 and the second switch assembly 40. Therefore, the controller may control the first switch assembly 30 and the second switch assembly 40 to switch between the on state and the open state, which is equivalent to that an alternating current exists between the first battery group 11 and the second battery group 12, and the first battery group 11 and the second battery group 12 perform alternate charging and discharging to heat the battery pack 10, i.e., perform self-heating of the battery pack 10. In addition, when the first battery group 11 and the second battery group 12 perform alternate charging and discharging, both the first battery group 11 and the second battery group 12 are electrically connected to the winding 20, the first battery group 11 and the second battery group 12 perform mutual charging and discharging through the winding 20, and the first battery group 11 and the second battery group 12 charge the capacitor 50, so that the first battery group 11 and the second battery group 12 can supply power to the load 100, and the capacitor 50 can also supply power to the load 100.

In other words, in the embodiments of the present disclosure, the controller controls the first switch assembly 30 and the second switch assembly 40 to switch between the on state and the open state, so that it is equivalent to that an alternating current exists between the first battery group 11 and the second battery group 12. An effect of interlacing oscillations can be generated between the first battery group 11 and the second battery group 12 through the alternating current, so that the battery pack 10 can generate heat, to avoid heating the battery pack 10 in an external heating manner. In addition, heating is performed inside the battery pack 10, so that a temperature field distribution of the battery pack 10 can be uniform, thereby improving heating efficiency.

Figure 20:
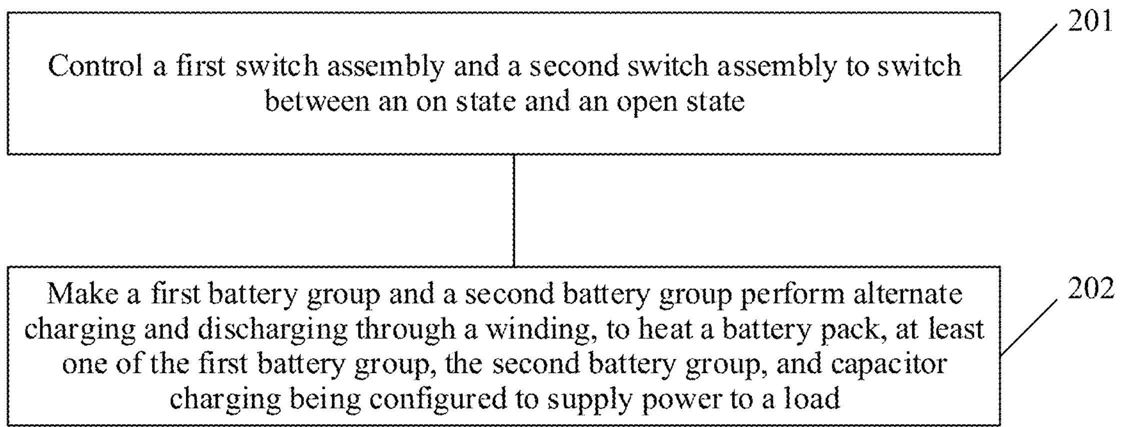
FIG. 20 is a flowchart of a control method according to an embodiment of the present disclosure.

FIG. 20 is a flowchart of a control method according to an embodiment of the present disclosure. The control method is applied to the battery self-heating control system in any embodiment of the foregoing embodiments. As shown in FIG. 20, the method includes the following steps:

Step 201: Control a first switch assembly and a second switch assembly to switch between an on state and an open state.

Step 202: Make a first battery group and a second battery group perform alternate charging and discharging through a winding, to heat a battery pack, at least one of the first battery group, the second battery group, and capacitor charging being configured to supply power to a load.

In the embodiments of the present disclosure, the connection line led out between the first battery group and the second battery group is connected to one end of the winding. The first switch assembly and the second switch assembly are connected in series. The first switch assembly is electrically connected to the positive electrode of the first battery group and the first end of the capacitor. The second switch assembly is electrically connected to the negative electrode of the second battery group and the second end of the capacitor. The first end and the second end of the capacitor are used for connecting to the load. Therefore, the first switch assembly and the second switch assembly may be switched between the on state and the open state, so that the first battery group and the second battery group can charge or discharge each other. After the first battery group charges the second battery group, the first battery group may be charged through the second battery group, so that a current direction of the first battery group changes periodically, and a current direction of the second battery group changes periodically, which is equivalent to that an alternating current exists between the first battery group and the second battery group. The controller is electrically connected to the first switch assembly and the second switch assembly. Therefore, the controller may control the first switch assembly and the second switch assembly to switch between the on state and the open state, which is equivalent to that an alternating current exists between the first battery group and the second battery group, and the first battery group and the second battery group perform alternate charging and discharging to heat the battery pack, i.e., perform self-heating of the battery pack. In addition, when the first battery group and the second battery group perform alternate charging and discharging, both the first battery group and the second battery group are electrically connected to the winding, the first battery group and the second battery group perform mutual charging and discharging through the winding, and the first battery group and the second battery group charge the capacitor, so that the first battery group and the second battery group can supply power to the load, and the capacitor can also supply power to the load.

In other words, in the embodiments of the present disclosure, the controller controls the first switch assembly and the second switch assembly to switch between the on state and the open state, so that it is equivalent to that an alternating current exists between the first battery group and the second battery group. An effect of interlacing oscillations can be generated between the first battery group and the second battery group through the alternating current, so that the battery pack can generate heat, to avoid heating the battery pack 10 in an external heating manner. In addition, heating is performed inside the battery pack, so that a temperature field distribution of the battery pack can be uniform, thereby improving heating efficiency.

In addition, in some implementations, in a case that the control system is in a first state, the controlling the first switch assembly and the second switch assembly to switch between the on state and the open state, to provide an alternating current between the first battery group and the second battery group, and making the first battery group and the second battery group perform alternate charging and discharging includes:

controlling, within a first half cycle of each control cycle, the first switch assembly and the second switch assembly to switch between the on state and the open state, and the first battery group to charge the winding and charge the second battery group through the winding, the capacitor or the first battery group and the capacitor being configured to supply power to the load; and controlling, within a second half cycle of each control cycle, the first switch assembly and the second switch assembly to switch between the on state and the open state, and the second battery group to charge the winding and charge the first battery group through the winding, the capacitor or the second battery group and the capacitor being configured to supply power to the load.

In addition, in some implementations, the controlling, within a first half cycle of each control cycle, the first switch assembly and the second switch assembly to switch between the on state and the open state, and the first battery group to charge the winding and charge the second battery group through the winding, the capacitor or the first battery group and the capacitor being configured to supply power to the load includes:

within a first time period of the first half cycle, controlling the first switch assembly to be in a closed state and the second switch assembly to be in the open state, the first battery group to charge the winding, and the capacitor to supply power to the load; and within a second time period of the first half cycle, controlling the first switch assembly to be in the open state and the second switch assembly to be in the closed state, the winding to charge the second battery group, and the first battery group and the capacitor to supply power to the load.

In addition, in some implementations, the controlling, within a second half cycle of each control cycle, the first switch assembly and the second switch assembly to switch between the on state and the open state, and the second battery group to charge the winding and charge the first battery group through the winding, the capacitor or the second battery group and the capacitor being configured to supply power to the load includes:

within a third time period of the second half cycle, controlling the first switch assembly to be in the open state, and controlling the second switch assembly to be in the closed state, the second battery group to charge the winding, and the capacitor to supply power to the load;

within a fourth time period of the second half cycle, controlling the first switch assembly to be in the closed state and the second switch assembly to be in the open state, the winding to charge the first battery group, and the second battery group and the capacitor to supply power to the load.

In addition, in some implementations, in a case that the control system is in a second state, the controlling the first switch assembly and the second switch assembly to switch between the on state and the open state, to provide an alternating current between the first battery group and the second battery group, and making the first battery group and the second battery group perform alternate charging and discharging includes:

when a battery level of the first battery group is greater than a battery level of the second battery group, within the first time period of each control cycle, controlling the first switch assembly and the second switch assembly to switch between the on state and the open state, and controlling the first switch assembly to be in the closed state and the second switch assembly to be in the open state, the first battery group to charge the winding, and the first battery group, the second battery group, and the capacitor to supply power to the load; and within the second time period of each control cycle, controlling the first switch assembly to be in the open state and the second switch assembly to be in the closed state, the winding to charge the second battery group, and the first battery group and the second battery group to supply power to the capacitor and the load.

In addition, in some implementations, in a case that the control system is in a second state, the controlling the first switch assembly and the second switch assembly to switch between the on state and the open state, to provide an alternating current between the first battery group and the second battery group, and making the first battery group and the second battery group perform alternate charging and discharging further includes:

in a case that the control system is in the second state, when the battery level of the first battery group is greater than the battery level of the second battery group, within the third time period of each control cycle, controlling the first switch assembly to be in the open state, and controlling the second switch assembly to be in the closed state, the second battery group to charge the winding, and the first battery group, the second battery group, and the capacitor to supply power to the load; and within the fourth time period of each control cycle, controlling the first switch assembly to be in the closed state and the second switch assembly to be in the open state, the winding to charge the first battery group, and the first battery group and the second battery group to supply power to the capacitor and the load.

In addition, in some implementations, the method further includes: in a case that the second battery group is damaged, controlling the first switch assembly and the second switch assembly to be alternately in the on state, and making the winding, the first switch assembly, the second switch assembly, and the capacitor form a boost circuit, the first battery group supplying power to the load through the boost circuit; and in a case that the first battery group is damaged, controlling the first switch assembly and the second switch assembly to be alternately in the on state, and making the winding, the first switch assembly, the second switch assembly, and the capacitor form a boost circuit, the second battery group supplying power to the load through the boost circuit.

Embodiments of the present disclosure provide an electric transportation means, such as an electric vehicle. The electric transportation means includes the battery self-heating control system in any embodiment of the foregoing embodiments.

In addition, in the embodiments of the present disclosure, the electric transportation means may further include a charging interface, and the charging interface is electrically connected to a battery pack to charge the battery pack.

The charging interface is electrically connected to the battery pack 10, and therefore the battery pack 10 may be charged through the charging interface. In addition, in a process of charging the battery pack 10, the first switch assembly 30 and the second switch assembly 40 may be further controlled through a controller, to make the battery pack 10 perform self-heating.

It should be noted that the embodiments in this specification are all described in a progressive manner. Description of each of the embodiments focuses on differences from other embodiments, and reference may be made to each other for the same or similar parts among respective embodiments.

Although optional embodiments of the embodiments of the present disclosure have been described, once knowing the basic creative concept, a person skilled in the art can make additional changes and modifications to these embodiments. Therefore, the following claims are intended to be construed as to cover the optional embodiments and all changes and modifications falling within the scope of the embodiments of the present disclosure.

Finally, it should further be noted that the relational terms herein such as first and second are used only to differentiate an entity from another entity, and do not require or imply any actual relationship or sequence between these entities. Moreover, the term "include," "comprise," or any variation thereof is intended to cover a non-exclusive inclusion. Therefore, an object or a terminal apparatus that includes a series of elements not only includes such elements, but also includes other elements not specified expressly, or includes inherent elements of the object or terminal apparatus. If no more limitations are made, an element limited by "include a/an . . . " does not exclude other same elements existing in the article or the terminal apparatus which includes the element.

The technical solutions provided in the present disclosure are described in detail above. The principles and implementations of the present disclosure are described in this specification by using specific examples. In addition, a person of ordinary skill in the art may make modifications to the specific implementations and application scopes according to the principles and implementations of the present disclosure. In summary, the content of this specification should not be construed as limiting the present disclosure.

What is claimed is:

1. A battery self-heating control system, the control system comprising: a battery pack, a winding, a first switch assembly, a second switch assembly, a capacitor, and a controller;

the battery pack comprising a first battery group and a second battery group that are connected in series, a connection line being led out between the first battery group and the second battery group, and the connection line being connected to one end of the winding;

the first switch assembly and the second switch assembly being connected in series, the first switch assembly being electrically connected to a positive electrode of the first battery group and a first end of the capacitor, the second switch assembly being electrically connected to a negative electrode of the second battery group and a second end of the capacitor, the first end and the second end of the capacitor being used for connecting to a load, and the other end of the winding being connected between the first switch assembly and the second switch assembly; and the controller being electrically connected to the first switch assembly and the second switch assembly, the controller being configured to control the first switch assembly and the second switch assembly to switch between an on state and an open state, and make the first battery group and the second battery group perform alternate charging and discharging through the winding, to heat the battery pack, and at least one of the first battery group, the second battery group, and the capacitor being configured to supply power to the load, wherein in a case that the control system is in a first state, within a first half cycle of each control cycle of the controller, the controller is configured to control the first switch assembly and the second switch assembly to switch between the on state and the open state, and the first battery group to charge the winding and charge the second battery group through the winding, and the capacitor and/or the first battery group are/is configured to supply power to the load; and within a second half cycle of each control cycle of the controller, the controller is configured to control the first switch assembly and the second switch assembly to switch between the on state and the open state, and the second battery group to charge the winding and charge the first battery group through the winding, and the capacitor and/or the second battery group are/is configured to supply power to the load.

2. The battery self-heating control system according to claim 1, wherein within a first time period of the first half cycle, the controller controls the first switch assembly to be in a closed state and the second switch assembly to be in the open state, the first battery group to charge the winding, and the capacitor to supply power to the load; and within a second time period of the first half cycle, the controller controls the first switch assembly to be in the open state and the second switch assembly to be in the closed state, the winding to charge the second battery group, and the first battery group and the capacitor to supply power to the load.

3. The battery self-heating control system according to claim 1, wherein within a third time period of the second half cycle, the controller controls the first switch assembly to be in the open state, and controls the second switch assembly to be in the closed state, the second battery group to charge the winding, and the capacitor to supply power to the load; and within a fourth time period of the second half cycle, the controller controls the first switch assembly to be in the closed state and the second switch assembly to be in the open state, the winding to charge the first battery group, and the second battery group and the capacitor to supply power to the load.

4. A battery self-heating control system, the control system comprising: a battery pack, a winding, a first switch assembly, a second switch assembly, a capacitor, and a controller;

the battery pack comprising a first battery group and a second battery group that are connected in series, a connection line being led out between the first battery group and the second battery group, and the connection line being connected to one end of the winding;

the first switch assembly and the second switch assembly being connected in series, the first switch assembly being electrically connected to a positive electrode of the first battery group and a first end of the capacitor, the second switch assembly being electrically connected to a negative electrode of the second battery group and a second end of the capacitor, the first end and the second end of the capacitor being used for connecting to a load, and the other end of the winding being connected between the first switch assembly and the second switch assembly; and the controller being electrically connected to the first switch assembly and the second switch assembly, the controller being configured to control the first switch assembly and the second switch assembly to switch between an on state and an open state, and make the first battery group and the second battery group perform alternate charging and discharging through the winding, to heat the battery pack, and at least one of the first battery group, the second battery group, and the capacitor being configured to supply power to the load, wherein in a case that the control system is in a second state, a battery level of the first battery group is greater than a battery level of the second battery group, and within a first time period of each control cycle, the controller controls the first switch assembly and the second switch assembly to switch between the on state and the open state, and controls the first switch assembly to be in the closed state and the second switch assembly to be in the open state, the first battery group to charge the winding, and the first battery group, the second battery group, and the capacitor to supply power to the load; and within a second time period of each control cycle, the controller controls the first switch assembly to be in the open state and the second switch assembly to be in the closed state, the winding to charge the second battery group, and the first battery group and the second battery group to supply power to the capacitor and the load.

5. The battery self-heating control system according to claim 4, wherein in a case that the control system is in the second state, the battery level of the first battery group is greater than the battery level of the second battery group, and within a third time period of each control cycle, the controller controls the first switch assembly to be in the open state, and controls the second switch assembly to be in the closed state, the second battery group to charge the winding, and the first battery group, the second battery group, and the capacitor to supply power to the load; and within a fourth time period of each control cycle, the controller controls the first switch assembly to be in the closed state and the second switch assembly to be in the open state, the winding to charge the first battery group, and the first battery group and the second battery group to supply power to the capacitor and the load.

6. The battery self-heating control system according to claim 1, wherein in a case that the second battery group is damaged, the controller controls the first switch assembly and the second switch assembly to be alternately in the on state, and makes the winding, the first switch assembly, the second switch assembly, and the capacitor form a boost circuit, and the first battery group supplies power to the load through the boost circuit; and in a case that the first battery group is damaged, the controller controls the first switch assembly and the second switch assembly to be alternately in the on state, and makes the winding, the first switch assembly, the second switch assembly, and the capacitor form a boost circuit, and the second battery group supplies power to the load through the boost circuit.

7. The battery self-heating control system according to claim 1, wherein a switch device is arranged on the connection line, the switch device is electrically connected to the controller, and the controller is configured to control the switch device to be in the on state or the open state;

in a case that the switch device is in the on state, the battery pack supplies power to the load, and performs self-heating; and in a case that the switch device is in the open state, the battery pack supplies power to the load only.

8. A control method for a battery self-heating control system, the control system comprising: a battery pack, a winding, a first switch assembly, a second switch assembly, a capacitor, and a controller; the battery pack comprising a first battery group and a second battery group that are connected in series, a connection line being led out between the first battery group and the second battery group, and the connection line being connected to one end of the winding; the first switch assembly and the second switch assembly being connected in series, the first switch assembly being electrically connected to a positive electrode of the first battery group and a first end of the capacitor, the second switch assembly being electrically connected to a negative electrode of the second battery group and a second end of the capacitor, the first end and the second end of the capacitor being used for connecting to a load, and the other end of the winding being connected between the first switch assembly and the second switch assembly; and the controller being electrically connected to the first switch assembly and the second switch assembly, the controller being configured to control the first switch assembly and the second switch assembly to switch between an on state and an open state, and make the first battery group and the second battery group perform alternate charging and discharging through the winding, to heat the battery pack, and at least one of the first battery group, the second battery group, and the capacitor being configured to supply power to the load, wherein in a case that the control system is in a first state, within a first half cycle of each control cycle of the controller, the controller is configured to control the first switch assembly and the second switch assembly to switch between the on state and the open state, and the first battery group to charge the winding and charge the second battery group through the winding, and the capacitor and/or the first battery group are/is configured to supply power to the load; and within a second half cycle of each control cycle of the controller, the controller is configured to control the first switch assembly and the second switch assembly to switch between the on state and the open state, and the second battery group to charge the winding and charge the first battery group through the winding, and the capacitor and/or the second battery group are/is configured to supply power to the load, the method comprising:

controlling the first switch assembly and the second switch assembly to switch between the on state and the open state; and making the first battery group and the second battery group perform alternate charging and discharging through the winding, to heat the battery pack.

9. An electric vehicle, comprising the battery self-heating control system according to claim 1.

* * * * *